May 26, 1925.  
C. E. HODLICK  
1,539,485  
VAPORIZING APPARATUS  
Filed May 15, 1922
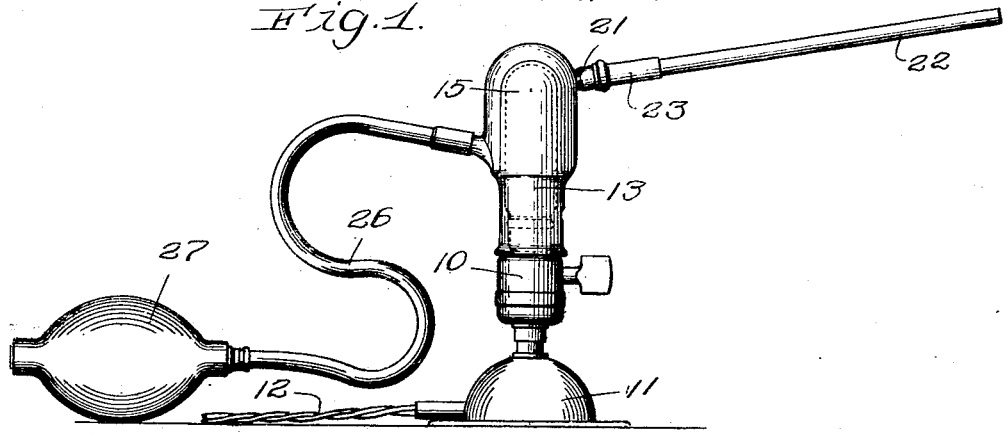
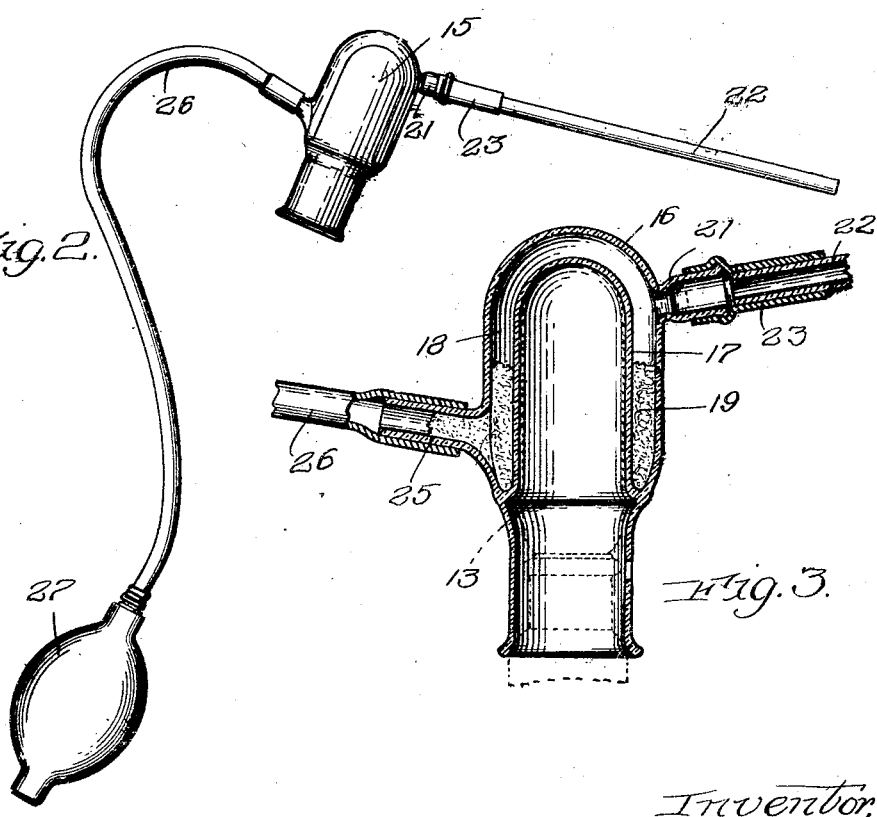
Inventor,
Charles E. Hodlick Patented May 26, 1925.

1,539,485

UNITED STATES PATENT OFFICE.

CHARLES E. HODLICK, OF CHICAGO, ILLINOIS, ASSIGNOR TO SHARP & SMITH, OF CHICAGO, ILLINOIS, A CORPORATION OF ILLINOIS.

VAPORIZING APPARATUS.

Application filed May 15, 1922. Serial No. 561,152.

*To all whom it may concern:*

Be it known that I, CHARLES E. HODLICK, a citizen of the United States, residing at Chicago, in the county of Cook and State of Illinois, have invented a new and useful Improvement in Vaporizing Apparatus, of which the following is a specification.

This invention relates to improvements in vaporizing apparatus and will be fully understood by reference to the following specification and accompanying drawings.

In that form of device embodying the features of my invention shown in the drawings, Figure 1 is a view in side elevation of my improved vaporizing apparatus, Figure 2 is a view in side elevation of the container showing the same removed from the lamp, and Figure 3 is a vertical sectional view of the apparatus.

As shown in the drawings, 10 indicates an incandescent lamp socket of ordinary type mounted on a suitable supporting base 11. 12 indicates the flexible electric cord supplying current to the socket. Mounted within the socket 10 in the ordinary manner is an incandescent bulb 13 which is substantially cylindrical in form with its upper end rounded.

15 indicates a container made of glass cap-shaped in form and provided with a double wall of its upper part. The cap-shaped container 15 is formed so that it will easily fit over the bulb 13 and be supported thereby as shown in Fig. 1. In Fig. 2 the container 15 is shown removed from the lamp 13.

As stated before, the container 15 has its upper part provided with a double wall, the outer wall being indicated by 16 and the inner by 17 (see Fig. 3). There is thus formed between these two walls a chamber 18. The material to be vaporized by heat is placed within the chamber 18. For example, I have shown in this chamber 18, pulverized iodine as indicated by 19; although it is apparent that other substances may be used, as desired. The chamber 18 is provided with an outlet nipple 21 to which is attached a glass tube 22 by means of a rubber connection 23. The chamber 18 is also provided with an inlet nipple 25 to which is attached one end of a rubber tube 26. To the other end of the tube 26 is attached an ordinary rubber bulb such as indicated by 27 adapted, upon squeezing, to force air through the chamber 18 and out through the tube 22.

In the use of the device, the substance to be vaporized such as iodine, for example, is placed in the chamber 18 by pouring it, in a vaporized or granulated form, through the tube 22, or through the nipple 25. The container 15 is then placed on the lamp 13 as shown in Fig. 1. The heat from the lamp vaporizes the substance 19. When it is desired to apply the vapor, the container 15 may be removed from the lamp, as shown in Fig. 2, and the tube 22 directed as desired, so that squeezing of the bulb 27, will force vapor from the chamber 18 through the tube 22 against the object to which the vapor is to be applied. For example, if iodine is vaporized, the tube 22 may be directed against a wound, or any surface of the body which might be benefited by the application of iodine vapor.

The device will be found especially valuable in cases where irregular, intermittent or infrequent use is desired. In such cases, the container 15 may remain normally on the bulb 13 as shown in Fig. 1; the bulb thus acting as a holder or support for the container. When thus in position, the heat from the lamp will keep the substances within the container vaporized and ready for immediate use at any time. In the event that vapor is to be applied, the container may be easily and quickly removed from the lamp and the vapor applied where desired. The substance vaporized will remain hot long enough to permit the expulsion of the desired amount of vapor. The container is then placed back on top of the lamp where it will remain normally, and where the substance inside will be kept hot. One specially desirable feature of the device is that the container 15 is made of glass so that it can be readily seen whether the lamp 13 is burning or not. Because of this construction, one can always see how much substance is within the container. Since the container is made of glass, the light from the lamp 13 will shine through and give a certain amount of illumination which might be useful.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is:

1. A device of the character described consisting of a lower cylindrical single wall open portion of a size and shape to fit over the bulb of an electric light fixture and enclose the lower portion of the same, and a double wall portion extending vertically from said single wall portion, said double wall portion being adapted to completely enclose the upper portion of the bulb when the device is placed thereover, the space between said double walls providing a closed chamber to hold a substance to be vaporized.

2. A device of the character described consisting of a lower cylindrical single wall open portion of a size and shape to fit over the bulb of an electric light fixture and enclose the lower portion of the same, and a double wall portion extending vertically from said single wall portion, said double wall portion being adapted to completely enclose the upper portion of the bulb when the device is placed thereover, the space between said double walls providing a closed chamber to hold a substance to be vaporized, the outer one of said double walls being provided with an inlet nipple and an outlet nipple.

In testimony whereof, I have hereunto set my hand and seal this 12 day of May, A. D. 1922.

CHARLES E. HODLICK. [L. S.]